United States Patent Office 3,214,436
Patented Oct. 26, 1965

3,214,436
BENZOTRIAZOLE COMPOUNDS
Richard James Boyle, Somerville, and Jerry Peter Milionis, Franklin Township, Somerset County, N.J., assignors to American Cyanamid Company, Stamford, Conn., a corporation of Maine
No Drawing. Original application Dec. 19, 1960, Ser. No. 76,446. Divided and this application Sept. 28, 1964, Ser. No. 399,893
8 Claims. (Cl. 260—308)

This application is a division of application Serial No. 76,446, filed December 19, 1960.

This invention relates to a new class of o-hydroxyphenylbenzotriazoles, to their use as ultraviolet absorbers in plastics for the protection of such materials and to the resinous materials thus protected.

It is an object of this invention to provide a new class of ortho-hydroxyphenylbenzotriazoles.

It is another object of this invention to provide plastic materials, especially synthetics, stabilized against deterioration from ultraviolet light by having admixed therewith an ortho-hydroxyphenylbenzotriazole of this invention.

It is a further object of this invention to provide, as a new class of modified resins, esters of an ortho-hydroxyphenylbenzotriazole of this invention with a copolymerized monomer selected from the group consisting of polymerizable hydroxylic monomers and polymerizable carboxylic monomers.

Other objects of this invention will be made apparent hereinafter.

In general, the compounds of this invention are ortho-hydroxyphenylbenzotriazoles of the following general Formula I:

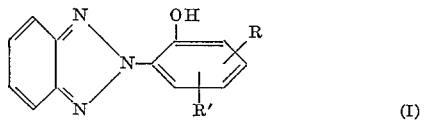

(I)

wherein R is carboxy, hydroxyalkyl, hydroxyalkoxy, carboxyalkyl or carboxyalkoxy; and R' is hydrogen, chloro, bromo, iodo, hydroxy, carboxy, hydroxyalkyl, hydroxyalkoxy, carboxyalkyl or carboxyalkoxy.

The compounds of Formula I can be prepared by one method which comprises coupling ortho-nitrobenzenediazonium chloride prepared by customary means from o-nitroaniline, with a compound of the Formula II:

(II)

wherein R and R' are as hereinbefore defined.

Among the specific compounds within the scope of Formula II, there may be named inter alia:

4-hydroxybenzoic acid,
2-hydroxy-5-chlorobenzoic acid,
2,4-dihydroxybenzoic acid,
4-hydroxyphenylacetic acid,
3-hydroxy-6-bromo-phenylacetic acid,
β-(4-hydroxyphenyl) propionic acid,
β-(2,4-dihydroxyphenyl) pentanoic acid,
4-hydroxyphenoxyacetic acid,
β-(4-hydroxyphenoxy) propionic acid,
α-(3-hydroxy-6-iodophenoxy) hexanoic acid,
3,5-dihydroxyphenoxyacetic acid,
4-(4-hydroxyphenoxy)-butan-1,2-dioic acid,
β-(3-hydroxyphenoxy)-ethanol,
β-(4-hydroxyphenoxy)-ethanol,
4-hydroxyphenoxymethyl ethylene glycol,
2-(4-hydroyphenoxy)hexane-1,5-diol,
β-(3-hydroxy-6-chlorophenyl) ethanol,
4-(4-hydroxy-6-carboxyphenyl)-butanol,
3,4-bis-β-hydroxyethyl-phenol, and
3,4-bis-carboxymethylphenol.

This coupling reaction, conducted under basic conditions, at room temperature, yields a product which upon acidification with a strong acid, e.g., hydrochloric or sulfuric acid, yields the compounds of the Formula III:

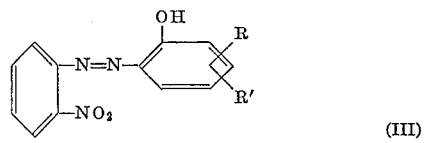

(III)

wherein R and R' are as hereinbefore defined. Reductive triazolization of the compound of Formula III, as with zinc and sodium hydroxide, yields the final products of Formula I.

Alternatively, compounds of Formula I can be prepared by condensing a 2-substituted benzotriazole of the Formula IV:

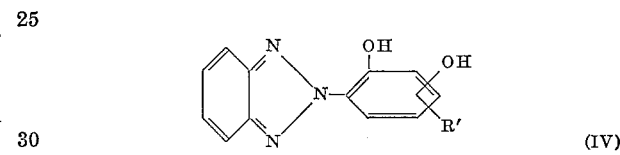

(IV)

wherein R' is as hereinbefore defined with a compound of the Formula V:

$$Hal-(C_nH_{2n+1-x}R'')_x \quad (V)$$

wherein $n$ is a positive integer (preferably less than 8); $x$ is 1 or 2; Hal is bromo or chloro; and R'' is a hydroxyl or carboxyl. (Alternatively, the compounds of Formula IV can be condensed with the corresponding epihalohydrin to yield compounds of Formula I wherein the phenyl substituent is substituted by an hydroxyalkoxy group.) The condensation reaction is preferably conducted in an organic solvent medium, e.g., acetone, methylethyl ketone, methylisobutyl ketone, at elevated (preferably reflux) temperatures under basic conditions, i.e., in the presence of a basic material such as an alkali metal carbonate, e.g., potassium carbonate or an organic amine, e.g., pyridine, collidine or triethanolamine.

Among the specific compounds within the scope of Formula IV may be named the following:

2-(2,4-dihydroxyphenyl)-benzotriazole,
2,(2,5-dihydroxyphenyl)-benzotriazole,
2-(2,4-dihydroxy-5-chlorophenyl)-benzotriazole,
2-(2,4-dihydroxy-5-carboxyphenyl)-benzotriazole, and
2-(2,4-dihydroxy-5-carboxymethylphenyl)-benzotriazole.

Among the specific compounds within the scope of Formula V may be named halogenated alkanoic and alkanedioic (preferably of less than 8 carbons) acids such as:

Bromoacetic acid,
β-chloropropionic acid,
Bromosuccinic acid,
α-bromoadipic acid and
6-bromohexanoic acid;

and halogenated alkanols and alkylene glycols (preferably of less than 8 carbons) such as:

Ethylene chlorohydrin
3-chloro-1,2-propanediol (or the corresponding epichlorohydrin)
3-bromo-1-propanol,
4-bromo-1,6-hexanediol, and
6-bromohexanol.

The condensation reaction yields the desired product of Formula I which can be isolated by acidification with a strong acid, e.g., mineral acids such as hydrochloric or sulfuric.

The compounds of Formula I are useful as additives for the protection of resinous polymers such as polyvinyl chloride, polyolefins, polyesters, polyamides, cellulosics, etc. from the deteriorating effect of ultraviolet light. They may be added to resins which may, or may not contain other additives or chemically bonded modifiers and in admixture therewith, provide protection against the effects of ultraviolet light. As additives, they are employed in amounts between 0.001 to 5.0 percent and preferably between 0.01 and 1.0 percent based on the weight of the final resin composition.

The compounds of this invention are particularly useful as chemically bonded ultraviolet absorbers for the protection of those resinous polymers formed from polymerizable carboxylic - or alcoholic hydroxy - containing monomers. The UV absorbers of this invention when thus used, are bonded to the resin through the ester-forming groups of the R radical above defined and the carboxy or hydroxy radicals, as the case may be, of the polymerizable monomer. The UV absorber may additionally be bonded in the same manner through the R' group when it is an ester forming radical. In being capable of being chemically bonded to the resinous polymer, they are not subject to being leached out by solvent action, or loss by exudation and thus provide a high degree of permanent protection against the deleterious effects of ultraviolet light. Suitable polymeric materials which can thus be protected are alkyd resins, polyester resins, epoxy resins, and polyurethane resins.

By the term "alkyd resins" is meant those resins which are formed by the condensation of polyhydric alcohols with resinifying carboxylic organic acids or anhydrides thereof, with or without additional modifiers such as resin acid, or other acid modifiers such as abietic acid, fatty acids, such as linseed fatty acid (e.g., ADM vegetable acid 520 composed of 6% palmitic acid, 4% stearic acid, 22% oleic acid, 17% linoleic acid and 51% linolenic acid) and drying oils. Suitable acidic components for the preparation of alkyd resins are phthalic anhydride or maleic anhydride along with varying amounts of modifying substances such as citric, malic, tartaric, azaleic, succinic, adipic, sebacic, pimelic and/or 1,8-naphthalic acids. Suitable polyhydric compounds are dihydric alcohols such as ethylene glycol, propylene glycol, and diethylene glycol or trihydric alcohols such as glycerol. Alkyd resins are further disclosed in U.S. 2,087,852, 1,950,468, and 1,860,164.

By the term "polyester resins" is intended resins formed by the poly condensation of dicarboxylic acids with dihydroxy alcohols, optionally containing varying amounts of monocarboxylic acids, monohydroxy alcohols, and even small amounts of polycarboxylic acids and polyhydroxy alcohols.

By the term "epoxy resins" is intended resins resulting from the condensation of epichlorhydrin with polyhydric phenol and also resins made by epoxidation of unsaturated compounds, e.g., unsaturated fatty acids and esters, polybutadienes, vegetable oils, vinylcyclohexene, dicyclopentadiene, etc. Examples of such epoxy resins are the diglycidyl ethers of dihydric phenols and epoxy esters of polybasic acids, e.g., diglycidyl phthalides. Epoxy resins are more fully disclosed in U.S. 2,886,473.

By the term "polyurethane resins" is meant resins having reoccuring aminoformic ester units, i.e., urethane groups. They are usually derived from polyisocyanates reacted with compounds containing active hydrogens such as polyhydric alcohols, glycols, polyethers, and polyesters. Examples of the most commonly used isocyanates are toluene-2,4-diisocyanate, methylene-bis-4-phenylisocyanate, naphthylene-1,5-diisocyanate, tritolylmethanetriisocyanate, 3,3'-bitolylene-4,4'-diisocyanate, phenyl isocyanate, hexamethylene diisocyanate, naphthyl isocyanate, and 2,3,5,6-tetramethyl-1,4-benzene diisocyanate. Examples of the active hydrogen containing compounds which may be used as components in polyurethane formulations with isocyanates are polyhydroxy compounds such as ethylene glycol, diethylene glycol, various polyethylene glycols, glycerol, pentaerythritol, resorcinol, bis-(4-hydroxyhpenyl)-dimethyl methane, etc.; polybasic acids such as adipic acid, aconitic acid, isophthalic acid, etc.; diethanolamine, and thio compounds such as thioglycolic acids, 2-mercaptoethanol, etc.

When the compounds of this invention are used as modifiers for ultraviolet absorption, they are added to the various polymerizable mixes before complete polymerization, and polymerization is then effected by known methods. Generally, depending on the desired properties and the intended application of the modified resins, from about 1 to 20% or even more of the UV absorber of this invention based on the weight of the final composition, can be used as a modifying monomer.

This invention is further illustrated by the following examples wherein parts, unless otherwise stated, are measured on a weight basis.

*Example 1.*—2-(4-carboxymethoxy-2-hydroxyphenyl) benzotriazole

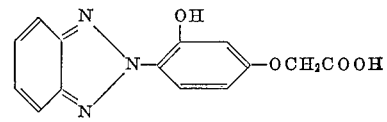

A suspension of 15.8 g. of 2-(2,4-dihydroxyphenyl) benzotriazole, 15.0 g. of potassium carbonate, 9.8 g. of bromoacetic acid and 250 ml. acetone is refluxed with stirring for 31 hours, and then diluted with 1½ liters of water. The mixture is then acidified with dilute hydrochloric acid, yielding a precipitate which is filtered and dried. Recrystallization from ethanol affords pure 2-(4-carboxymethoxy-2-hydroxyphenyl)benzotriazole, melting at about 225° C.

Using 15.8 g. of 2-(2,5-dihydroxyphenyl)benzotriazole in place of 2-(2,4-dihydroxyphenyl)benzotriazole in the procedure of Example 1, there is obtained the product of the formula:

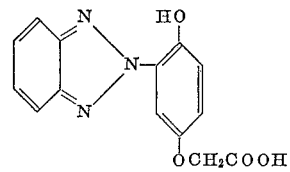

Following the procedure of Example 1 identically except for the use of 2-(2,4-dihydroxy-5-chlorophenyl) benbotriazole for the benzotriazole used therein, there is obtained the product 2-(2-hydroxy-4-carboxymethoxy-5-chlorophenyl)benzotriazole.

Following the procedure of Example 1 identically except for the use of α-bromoadipic acid and 6-bromohexanoic acid, there are obtained the products 2-[4-(2-adipyl)-2-hydroxyphenyl] benzotriazole and 2-(4-Ω-carboxyhexanoxy - 2 - hydroxyphenyl)benzotriazole, respectively.

*Example 2.*—2-[2-hydroxy-4-(β-hydroxyethoxy) phenyl] benzotriazole

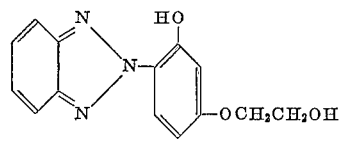

A suspension of 15.8 g. of 2-(2,4-dihydroxyphenyl) benzotriazole, 15.0 g. of potassium carbonate, 5.6 g. of ethylene chlorohydrin and 250 ml. of acetone is refluxed with stirring for 24 hours, after which the reaction mixture is added to 2 liters of water. The product which precipitates, is collected and recrystallized from ethanol yielding substantially pure 2-[2-hydroxy-4-(β-hydroxyethoxy)phenyl]benzotriazole.

The reaction of Example 2 is repeated with 7.7 g. of 3-chloro-2-hydroxy-1-propanol in place of ethylene chlorohydrin to yield the product 2 - [2 - hydroxy-4-(β,α - dihydroxypropoxy)phenylbenzotriazole of the formula:

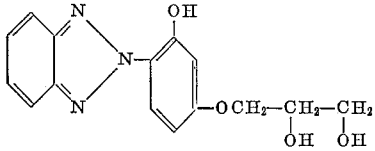

Substitution of ethylene bromohydrin in the procedure of Example 2 effects no change in the identity of the reaction product obtained.

*Example 3.—2-(5-carboxy-2,4-dihydroxyphenyl) benzotriazole*

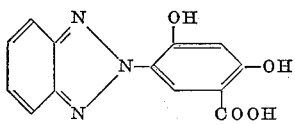

o-Nitroaniline (40.5 g.) is diazotized in the usual manner with concentrated hydrochloric acid (104 cc.) and sodium nitrite (22.1 g.). The excess nitrite is destroyed with sulfamic acid (3.0 g.) and the clear diazonium chloride solution is then added, below the surface, to a cooled solution (0–5° C.) of β-resorcylic acid (46.3 g. (in 1.5 liters of water containing sodium hydroxide (60.0 g.) The solution is stirred for 2 hours after the addition is completed and then is acidified with dilute hydrochloric acid.

The crude 2-(5-carboxy-2,4-dihydroxy)phenylazo-nitrobenzene thus obtained (30.3 g.) is treated with zinc dust (39.2 g.) and sodium hydroxide (240 cc., 5 N). The product thus obtained is recrystallized from toluene-hexane, folowed by another recrystallization from ethanol benzene to yield 2-(5-carboxy-2,4-dihydroxyphenyl)benzotriazole, M.P. about 250–1° C.

The procedure of Example 3 followed identically, except for the substitution of β-(2,4-dihydroxyphenyl)pentanoic acid and 4-(4-hydroxyphenoxy)-butan-1,2-dioic acid for β-resorcylic acid, yields the products 4-(5-benzotriazol-2-yl-4-hydroxyphenoxy)-butan-1,2-dioic acid and β - (2,4 - dihydroxy - 5 - benzotriazol - 2 - ylphenyl) pentanoic acid, respectively.

Following the procedure of Example 3 except for the substitution of omega-(3-hydroxy-6-iodophenoxy)hexanoic acid for the acid used therein there is obtained the product omega-(4-benzotriazol-2-yl-3-hydroxy-6-iodophenoxy)hexanoic acid.

*Example 4.—2-(5-carboxymethyl-2-hydroxyphenyl) benzotriazole*

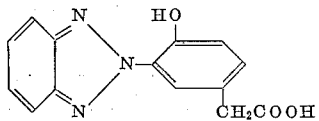

o-Nitroaniline (69.0 g.) is diazotized with hydrochloric acid (400 cc.) and sodium nitrite (38.0 g.). The clear yellow diazonium chloride solution thus formed is added dropwise to p-hydroxyphenylacetic acid (76.0 g.) in 2 liters of water containing sodium hydroxide (100 g.). After the addition is complete, the solution is acidified to yield an orange solid which is collected and dried. The dried solid is slurried in 1,200 cc. of water at the boil and then reductively triazolized with 1,200 cc. of sodium hydroxide solution (5 N—6.0 moles) and zinc dust (196 g.—3.0 moles). After 1 hour of heating the solution is filtered, cooled and acidified with dilute hydrochloric acid. Recrystallization from toluene and then alcohol yields about 3.4 g. of cream-colored 2-(5-carboxymethyl-2-hydroxyphenyl)benzotriazole, M.P. about 213–214° C.

Following the procedure of Example 4 except for the substitution of 3-hydroxy-6-bromo-phenylacetic acid for the acid used therein there is obtained the product 3-hydroxy-4-benzotriazol-2-yl-6-bromo-phenylacetic acid.

*Example 5.—2-(3-carboxy-5-chloro-2-hydroxyphenyl) benzotriazole*

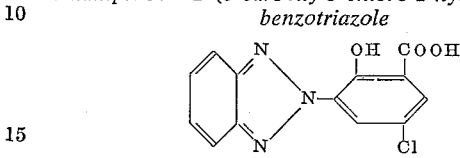

o-Nitroaniline (27.6 g.) is diazotized in the usual manner with concentrated hydrochloric acid (71.2 cc.) and sodium nitrite (14.5 g.). The excess nitrite is removed with sulfamic acid (2.0 g.) and the diazonium chloride solution is added dropwise over three hours to a cooled solution (—5 to +5° C.) of 5-chlorosalicylic acid (34.5 g.) in 1 liter of water containing sodium hydroxide (10 g.). After addition is complete, the slurry is acidified with dilute hydrochloric acid and the solid is collected by filtration. Treatment of this solid (32.2 g.), slurried in hot water, with zinc dust (33 g.) and sodium hydroxide (200 cc., 5 N) and then acidification with HCl results in the crude triazolized product. Recrystallization from toluene and alcohol yields the substantially pure product, 2 - (3 - carboxy - 5 - chloro - 2 - hydroxyphenyl)benzotriazole.

*Example 6.—Epoxy ester resin modified with 2-(4-carboxymethoxy-2-hydroxyphenyl)benzotriazole*

A mixture of the following is prepared:

| | Parts |
|---|---|
| Epoxy resin (Araldite 6084) | 22.3 |
| Linseed fatty acid | 23.9 |
| 2-(4-carboxymethoxy-2-hydroxyphenyl)benzotriazole | 5.1 |
| Xylene | 1.5 |

The mixture is heated to 160° C. at which point a vigorous reaction occurs. After heating at this temperature for one hour, 52 parts of xylene is added and the reaction is maintained at 135° C. for four hours. The xylene is then stripped off and the resin is diluted with 48.5 parts of a hydrocarbon solvent (Varsol I). (Analysis shows 54.2% solids and an acid number of 19.)

A similar preparation was made as a control, using 111.5 parts of epoxy resin (Araldite 6084), 145 parts of linseed fatty acid and 7.5 parts of xylene, but with no UV absorber. This mixture was reacted under an atmosphere of nitrogen at about 260° C. for three hours. After cooling to 200° C. and diluting with 242.5 parts of hydrocarbon solvent (Varsol I), the resin was analyzed (58% solids, acid number 2).

Ultraviolet absorption curves run on the control sample thus prepared and on the resin of Example 6 showed increased absorption of ultraviolet by the sample having the UV absorber.

A glass slide was coated with the epoxy resin prepared in Example 6. The thickness of the film was determined to be less than 0.5 mil. A transmission curve of this film showed complete absorption below 370 millimicrons, but transmission of pratically all visible light. The ultraviolet was not extracted from the plastic coating by soaking in 95% alcohol for 30 hours.

Aroldite 6084 epoxy resin is a product having an esterification equivalent of 175, epoxide equivalent of 950 and an epoxy value of 1.05.

Substitution of 2-(2-hydroxy-4-carboxymethoxyphenyl)benzotriazole, 2-(2-hydroxy-4-carboxymethoxy-5-chlorophenyl)benzotriazole and 2-(4-Ω-carboxyhexanoxy-2-hydroxyphenyl)benzotriazole for the benzotriazole in the procedure of Example 6 yields modified epoxy resins which respectively show enhanced ultraviolet absorption properties as compared to the control epoxy resin having no added benzotriazole absorbers.

The epoxy ester resin which results from the polymerization of epoxy resin (Epon 1004) (43 parts), linseed acids (47 parts), rosin (10 parts) and the benzotriazole of Example 1 (3 parts) shows enhanced ultraviolet absorption properties.

*Example 7.—Alkyd resin modified with 2-(5-carboxymethyl-2-hydroxyphenyl)benzotriazole*

A mixture of 19.2 parts of phthalic anhydride, 36.3 parts of linseed fatty acid 520, 13.8 parts of glycerol, 7.7 parts of xylene and 7.7 parts of 2-(5-carboxymethyl-2-hydroxyphenyl)benzotriazole is heated at 150° to 220° C. under a nitrogen atmosphere for 8 hours. The viscous liquid (of 62.7% solid content and an acid number of 3.16) which results is diluted with 40 parts xylene.

A similar preparation was made as a control, using the same composition as above but with no UV absorber of this invention. This mixture was reacted at 250° C. under a nitrogen atmosphere for 7 hours, before cooling and diluting with xylene to yield a liquid having 76.1% solids with an acid number of 6.17.

Comparison of ultraviolet absorption curves runs on the control sample and the product of Example 7 showed highly superior absorption of ultraviolet by the latter.

A glass slide was coated with the product of Example 7. The thickness of the film was determined to less than 0.5 mil. A transmission curve of this film showed complete absorption below 370 millimicrons, but transmission of practically all visible light. The absorber was not extracted from the plastic by soaking in alcohol for 30 hours.

Substitution of β-(2,4-dihydroxy-5-benzotriazol-2-ylphenyl)pentanoic acid and Ω-(4-benzotriazol-2-yl-3-hydroxy-6-iodophenoxy)hexanoic acid for the benzotriazole used in Example 7 yields modified alkyl resins which respectively show enhanced ultraviolet absorption properties as compared to the control alkyd resin having no added benzotriazole absorber.

*Example 8.—Alkyd resin modified with 2-(3-carboxy-5-chloro-2-hydroxyphenyl)benzotriazole*

A mixture of the following is prepared:

| | Parts |
|---|---|
| Soybean oil | 518 |
| Pentaerythritol | 130 |
| Phthalic anhydride | 245 |
| Maleic anhydride | 7 |
| 2-(3-carboxy-5-chloro-2-hydroxyphenyl)benzotriazole | 100 |
| Glycerol | 11 |

The soybean oil and pentaerythritol are charged into the resin kettle and heated with agitation under an atmosphere of nitrogen. When the temperature reaches 170° C., calcium hydroxide is added and the temperature is increased to 235 to 240° C. The reaction is continued until the product has a 1.5 to 1 compatibility with methanol. The mixture is cooled to 180° C., and the phthalic anhydride, maleic anhydride, glycerol and 2-(3-carboxy-5-chloro-2-hydroxyphenyl)benzotriazole are added. The temperature is maintained between 240 and 250° C. until the acid number is between 5 and 10. The product is cooled to 200° C., diluted to 70% solids with mineral spirits and then filtered.

This product shows enhanced ultraviolet absorption over the control example prepared without the UV absorber.

Substitution of 2-(5-carboxymethyl-2-hydroxyphenyl)benzotriazole in the procedure of Example 8 yields a modified alkyd resin having enhanced ultraviolet absorption.

*Example 9.—Urethane resin modified with 2-(3-carboxy-5-chloro-2-hydroxyphenyl)benzotriazole*

A urethane resin resulting from the polymerization of the following components:

| | |
|---|---|
| Tolylenediisocyanate * | 255.5 |
| Polypropyleneglycol (1,000 M.W.) | 183.7 |
| 1,3-butyleneglycol | 16.5 |
| Trimethylolpropane | 49.2 |
| Cellosolve acetate | 171.4 |
| Xylene | 171.4 |
| 2-[2-hydroxy-4(α,β-dihydroxypropoxy)phenyl]benzotriazole | 10.0 |

*80% of the 2,4 isomer and 20% of the 2,6 isomer substantially absorbs all ultraviolet light while transmitting substantially all light in the visible range.

*Example 10.—Alkyd resin containing 2-[2-hydroxy-4-(β-hydroxyethoxy)phenyl]benzotriazole*

A mixture of 440 parts of linseed fatty acid, 192 parts of phthalic anhydride, 123 parts of glycerol, 80 parts 2-[2-hydroxy-4-(β-hydroxyethoxy)phenyl]benzotriazole and 77 parts of xylene is heated to 200° C. under a nitrogen atmosphere for 6 hours. The resultant viscous product is diluted with 400 parts of xylene.

Substitution of 2-[2-hydroxy-4-(α,β-dihydroxypropoxy)phenyl]benzotriazole in the procedure of Example 10 yields a modified alkyd resin having enhanced ultraviolet absorption properties.

We claim:
1. A compound of the formula:

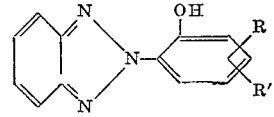

wherein R is a member selected from the group consisting of hydroxyalkoxy, carboxyalkyl and carboxyalkoxy; and R' is a member selected from the group consisting of hydrogen, chloro, bromo, iodo, hydroxy, carboxy, hydroxyalkyl, hydroxyalkoxy, carboxyalkyl, and carboxyalkoxy, all alkyl moieties in the named substituents having less than eight carbon atoms.

2. The compound 2-(2-hydroxy-4-carboxymethoxyphenyl)benzotriazole.
3. The compound 2-[4-(β-hydroxyethoxy)-2-hydroxyphenyl]benzotriazole.
4. The compound 2-(5-carboxymethyl-2-hydroxy-phenyl)benzotriazole.
5. The compound 2-(5-carboxymethyl-2,4-dihydroxyphenyl)benzotriazole.
6. The compound 2-(5-carboxymethoxy-2-hydroxyphenyl)benzotriazole.
7. The compound 2-[5-(β-hydroxyethoxy)-2-hydroxyphenyl]benzotriazole.
8. The compound 2-[4-(β,α-dihydroxypropoxy)-2-hydroxyphenyl]benzotriazole.

References Cited by the Examiner
UNITED STATES PATENTS

| | | | |
|---|---|---|---|
| 3,004,896 | 10/61 | Heller et al. | 260—45.8 |
| 3,072,585 | 1/63 | Milionis et al. | 260—308 |
| 3,076,782 | 2/63 | Mohr et al. | 260—308 |

FOREIGN PATENTS

| | | |
|---|---|---|
| 1,245,865 | 10/60 | France. |

NICHOLAS S. RIZZO, *Primary Examiner.*